Figure 1:
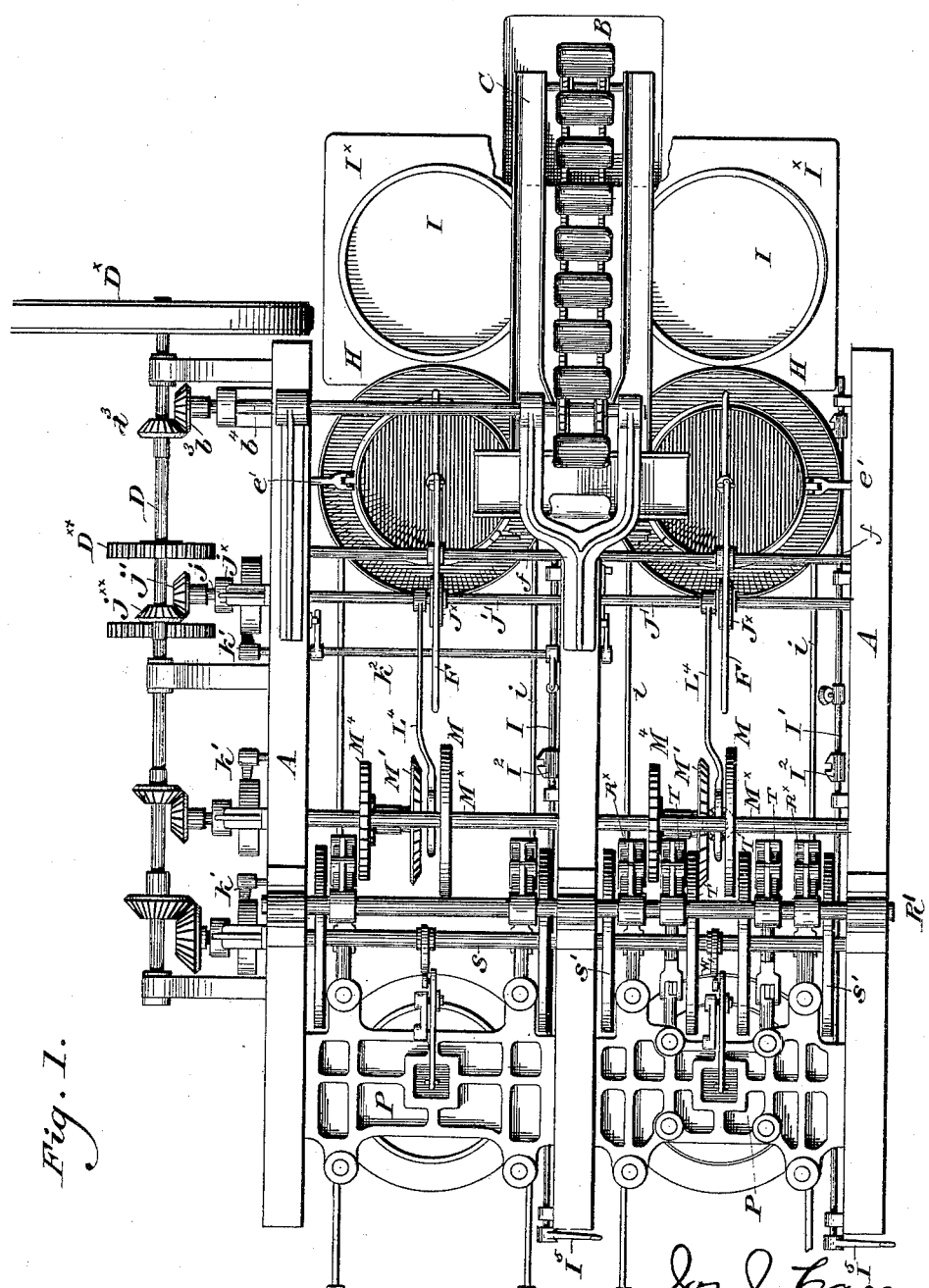

(No Model.) 11 Sheets—Sheet 1.

J. J. CARR.
MACHINE FOR MAKING SAND MOLDS.

No. 409,667. Patented Aug. 27, 1889.

WITNESSES
Jos. J. Carr
INVENTOR (No Model.) 11 Sheets—Sheet 4.
J. J. CARR.
MACHINE FOR MAKING SAND MOLDS.

No. 409,667. Patented Aug. 27, 1889.

WITNESSES
Joseph J. Carr
INVENTOR
By his Attorneys (No Model.)  11 Sheets—Sheet 5.
J. J. CARR.
MACHINE FOR MAKING SAND MOLDS.
No. 409,667.  Patented Aug. 27, 1889.
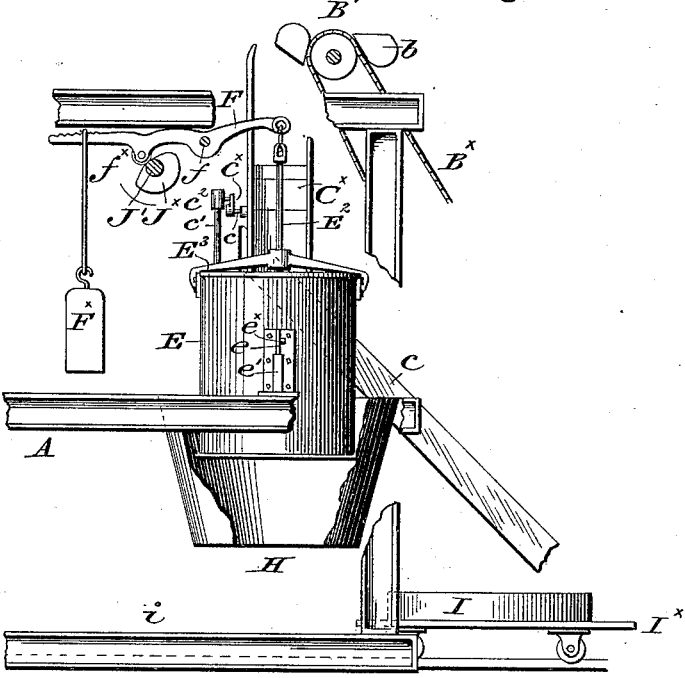
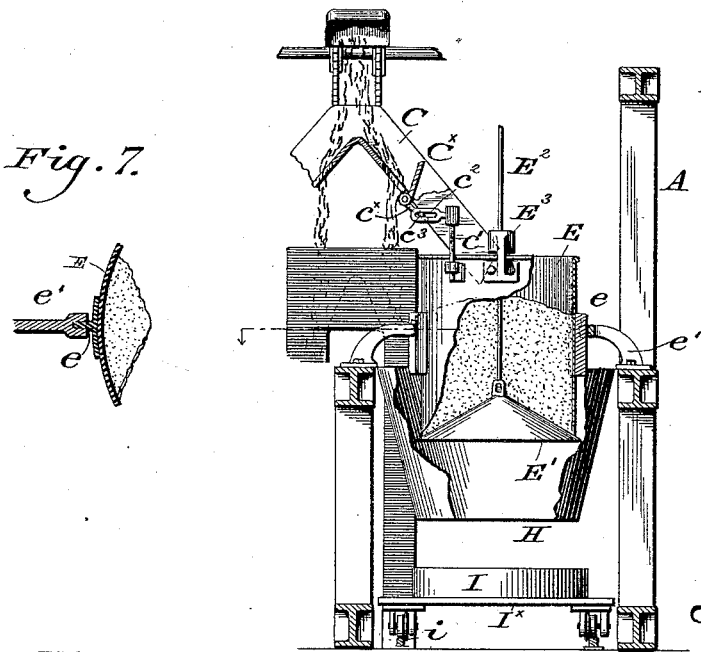
WITNESSES
R. B. Shephard.
F. N. Dixon.
INVENTOR
Joseph J. Carr
By his Attorneys
Wm. C. Strawbridge
J. Bonsall Taylor (No Model.) 11 Sheets—Sheet 6.

J. J. CARR.
MACHINE FOR MAKING SAND MOLDS.

No. 409,667. Patented Aug. 27, 1889.

WITNESSES
Ro. B. Shepherd
J. N. Dixon

INVENTOR
Jos. J. Carr
By his Attorneys
Wm. C. Strawbridge
J. Bonsall Taylor (No Model.) 11 Sheets—Sheet 7.

J. J. CARR.
MACHINE FOR MAKING SAND MOLDS.

No. 409,667. Patented Aug. 27, 1889.

WITNESSES
Rob B. Shepherd
F. N. Dixon

INVENTOR
Joseph J. Carr
By his Attorneys
Wm E. Strawbridge
Brosall Taylor (No Model.) 11 Sheets—Sheet 8.
J. J. CARR.
MACHINE FOR MAKING SAND MOLDS.
No. 409,667. Patented Aug. 27, 1889.
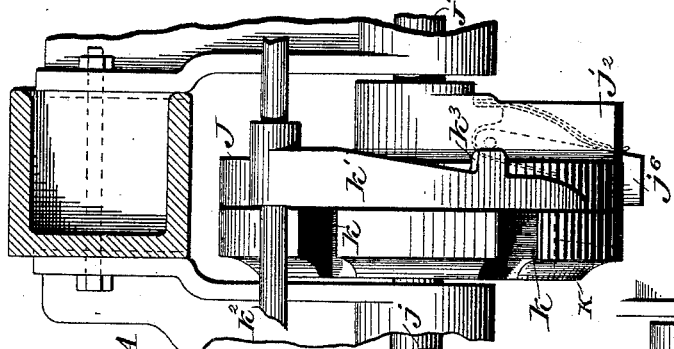
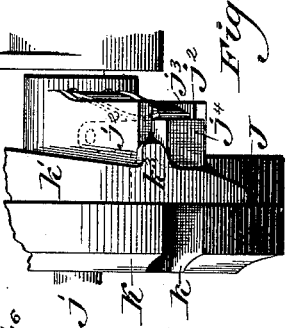
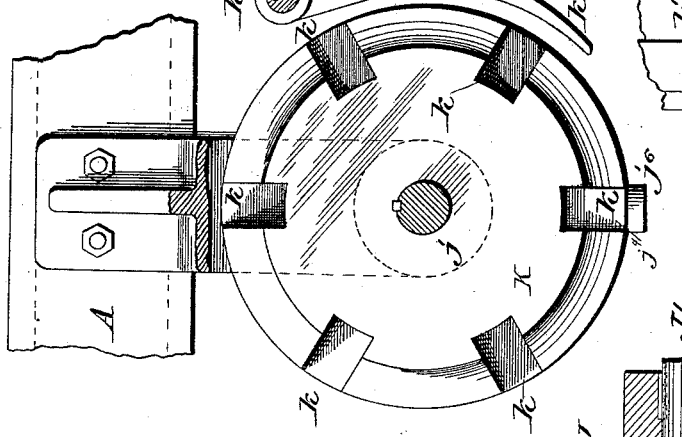
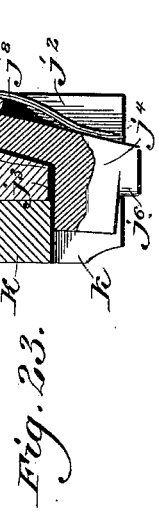
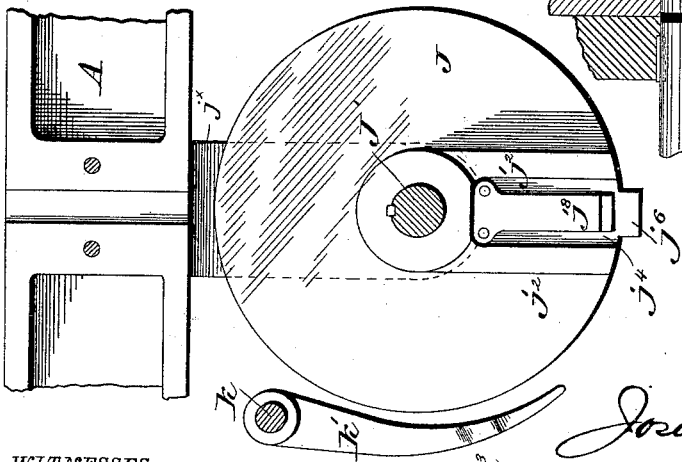
WITNESSES
R. B. Shepherd
F. N. Dixon
INVENTOR
Joseph J. Carr
By his Attorneys
Wm. C. Strawbridge
J. Bonsall Taylor (No Model.) 11 Sheets—Sheet 9.

J. J. CARR.
MACHINE FOR MAKING SAND MOLDS.

No. 409,667. Patented Aug. 27, 1889.

WITNESSES
Joseph J. Carr
INVENTOR
By his Attorneys (No Model.) 11 Sheets—Sheet 10.

J. J. CARR.
MACHINE FOR MAKING SAND MOLDS.

No. 409,667. Patented Aug. 27, 1889.

WITNESSES

UNITED STATES PATENT OFFICE.

JOSEPH J. CARR, OF WILKES-BARRÉ, PENNSYLVANIA, ASSIGNOR TO THE WILKES-BARRÉ MOLDING MACHINE COMPANY, OF SAME PLACE.

MACHINE FOR MAKING SAND MOLDS.

SPECIFICATION forming part of Letters Patent No. 409,667, dated August 27, 1889.

Application filed October 25, 1888. Serial No. 289,155. (No model.)

*To all whom it may concern:*

Be it known that I, JOSEPH J. CARR, a citizen of the United States, residing in Wilkes-Barré, in the county of Luzerne, in the State of Pennsylvania, have invented certain new and useful Improvements in Machines for Making Sand Molds, of which the following is a specification.

My invention relates to machines which are designed to form sand molds, and to such end to perform the successive operations of, first, depositing a predetermined quantity of sand within the flask in which the mold is to be formed, second by the manner in which the sand is placed in the flask and by the operation of a sweep, imparting to the sand an approximation of the ultimate form into which it is to be finally compressed,—and third, by pressure, compacting the sand within the flask to such a state of closeness or solidity as may be required for the endurance by the mold of the wear and tear incident to the operation of molding.

The object of my invention is the provision of a simple, and to a large extent an automatic machine, capable of carrying on, in an efficient manner, in the formation of sand molds, the operations or steps mentioned.

My invention is capable of embodiment in machines, for making sand molds, of any one or more of a variety of forms, but one of the most advantageous of the forms in which it can be embodied, is that which I have illustrated in the accompanying drawings and hereinafter specifically describe, namely, one employed for the manufacture of molds for the casting of car wheels.

Figure 2:
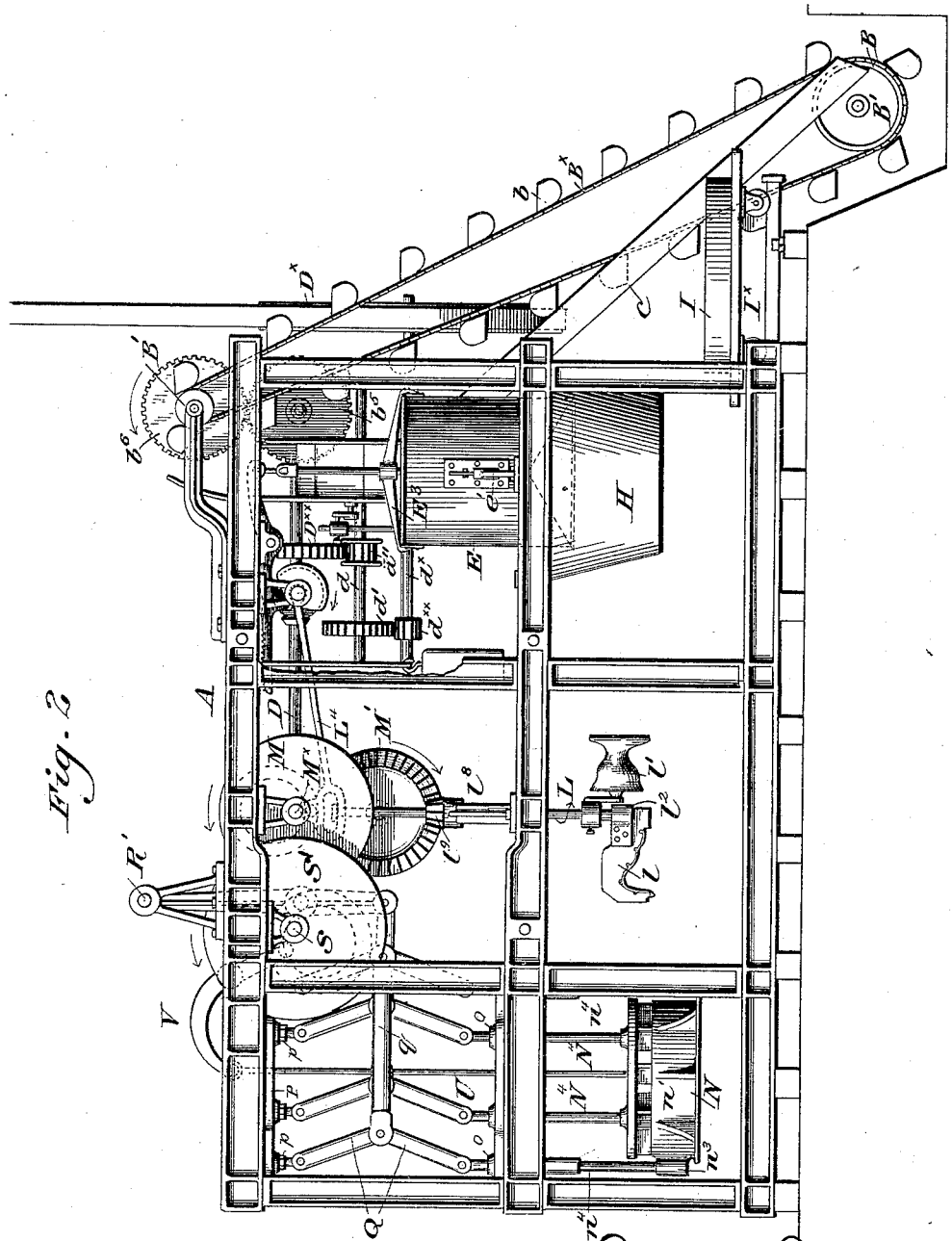
Figure 3:
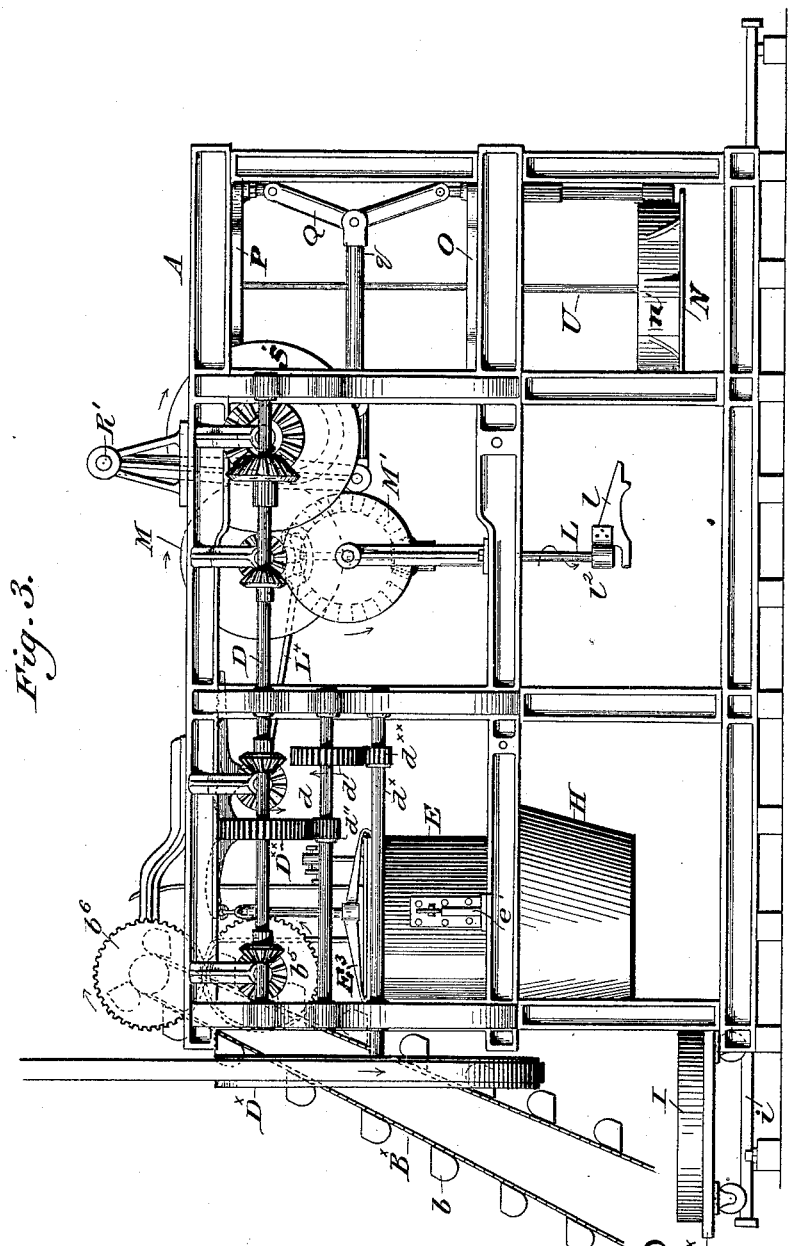
Figure 4:
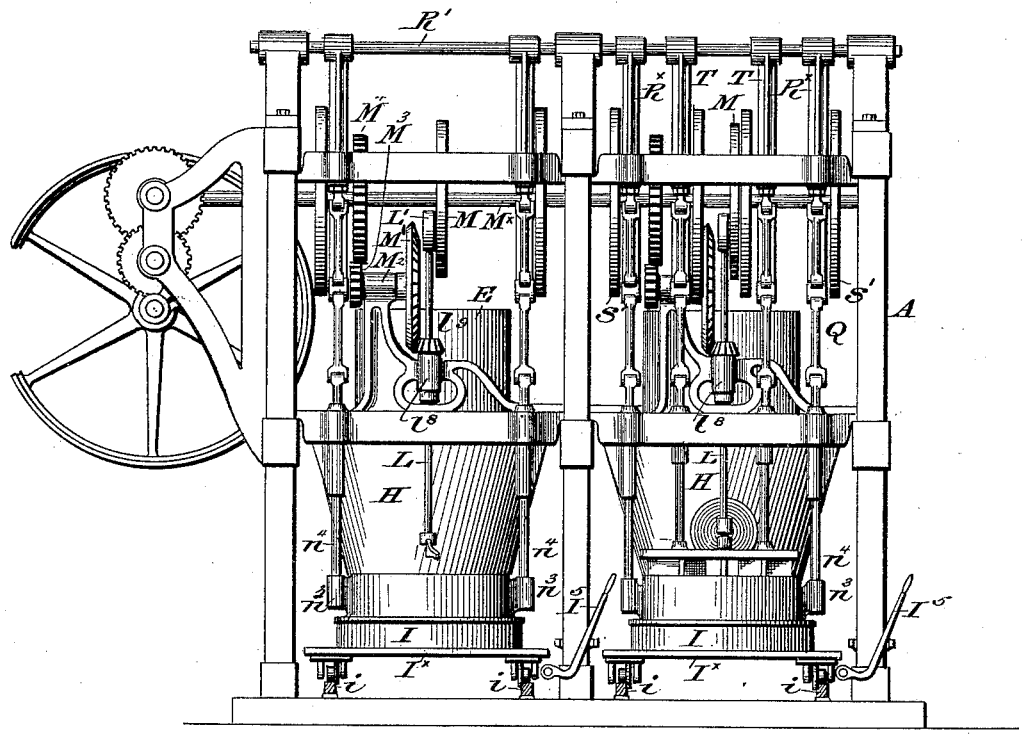
Figure 8:
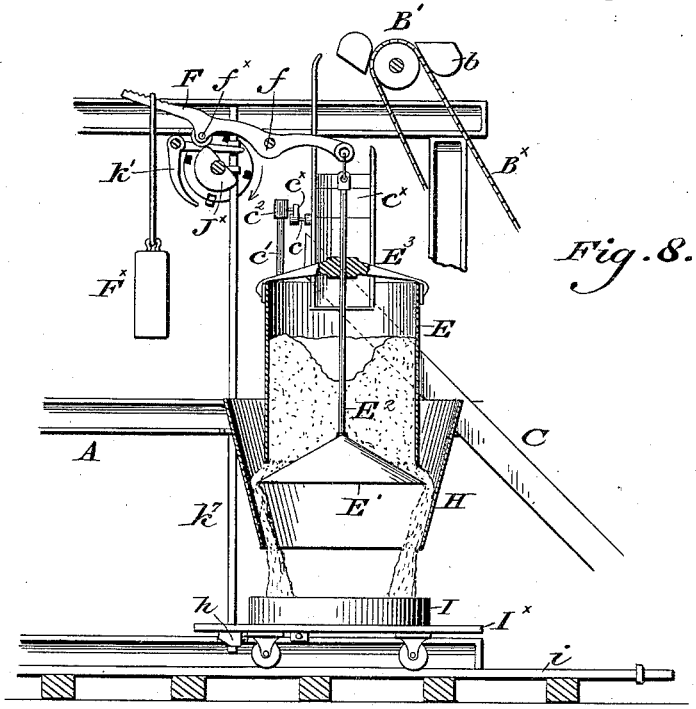
Figure 9:
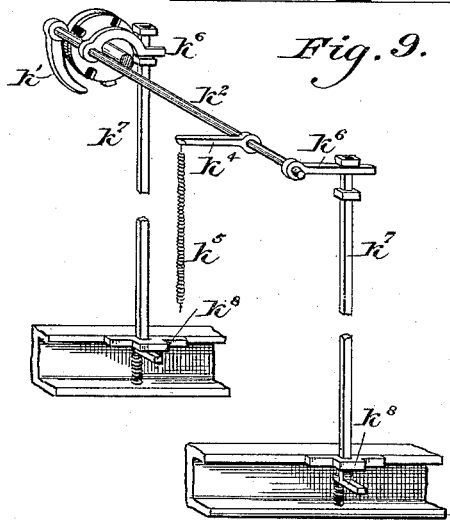
Figure 10:
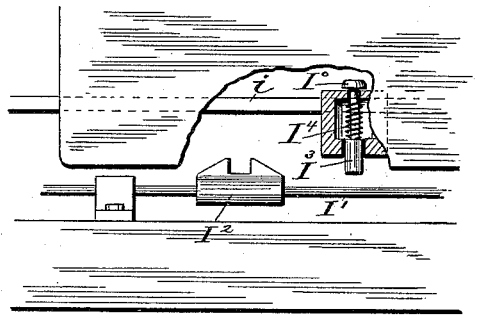
Figure 11:
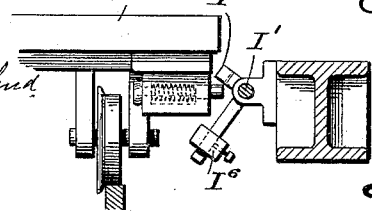
Figure 12:
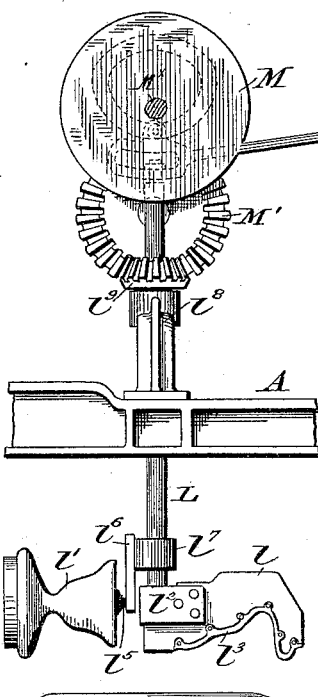
Figure 15:
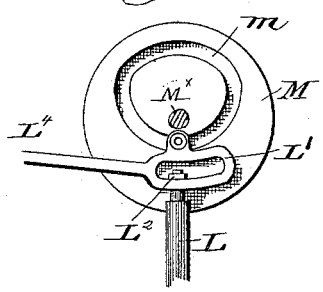
Figure 16:
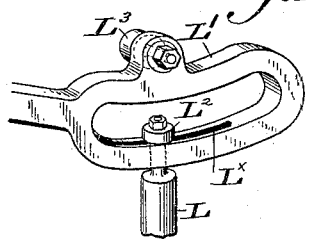
Figure 17:
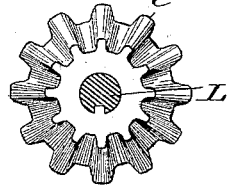
Figure 18:
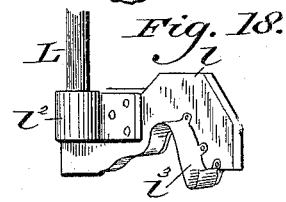
Figure 13:
Figure 19:
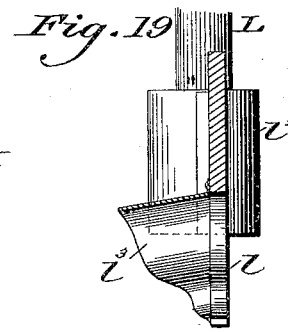
Figure 14:
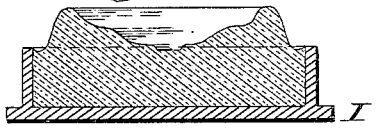

In the drawings, Figure 1 is a top plan view of the machine. In this view the train of devices which throw the clutches into and out of bite, and which are tripped in the passage of the trucks, are, with the exception of the train employed in connection with the sand receiver emptying devices,—for clearness of illustration omitted. Fig. 2 is a side elevational view of the machine, sight being taken from the right hand side of Fig. 1, and Fig. 3 is a side elevational view of the machine, sight being taken from the left hand side of Fig. 1. Most of the pattern support- ing and operating mechanism is omitted, it being in other figures, fully shown. Fig. 4 is an end elevational view of the machine, sight being taken from the left hand side of Fig. 2. Fig. 5 is a detail view of the sand receiver, chute, lever arm, and counterweight, and connected devices. Fig. 6 is a view from the end of the machine, of the sand receiver, its supporting devices, the chute, the chute gate, and the means for operating said chute gate. Fig. 7 is a detail view of one of the bracket arms, illustrating its sliding attachment to the sand receiver. Fig. 8 is a view of the devices illustrated in Fig. 5, parts of said devices being shown in section to exhibit their construction. Fig. 9 is a detail view of the train of devices by which the passage of a truck along the rails of the machine sets the clutch into operation. Fig. 10 is a detail view of the spring, bolt and latch by which the truck is locked into position. Fig. 11 is a side view of said devices, illustrating the manner in which unlocking is effected. Fig. 12 is a view of the sweep and its operating instrumentalities. Fig. 13 is a side view, and Fig. 14 a central section of a member of the flask upon which the sweep has operated. Fig. 15 is a detail view of the upper end of the reciprocating sweeper rod, illustrating its mounting in the cam way. Fig. 16 is a detail view of the link in which the upper end of the sweeper rod is entered. Fig. 17 is a detail view of the bevel gear wheel keyed upon the sweeper shaft. Fig. 18 is a perspective view of the sweeper arm. Fig. 19 is a cross sectional view of said sweeper arm. Fig. 20 is an elevational view of one of the clutches, sight being taken from the side of said clutch facing the interior of the machine, and the parts of said clutch being locked in engagement. Fig. 21 is an elevational view of one of the clutches, the parts being in the same position as in Fig. 20, and sight being taken from the side of the said clutch facing from the outside of the machine. Fig. 22 is a side elevational view of one of the clutches, the parts being in the position shown in Figs. 20 and 21, and sight being taken from the right hand side of said Fig. 21. Fig. 23 is a view of the plunger-coupling of the clutch, illustrating the manner in which it is mounted.

Figure 26:
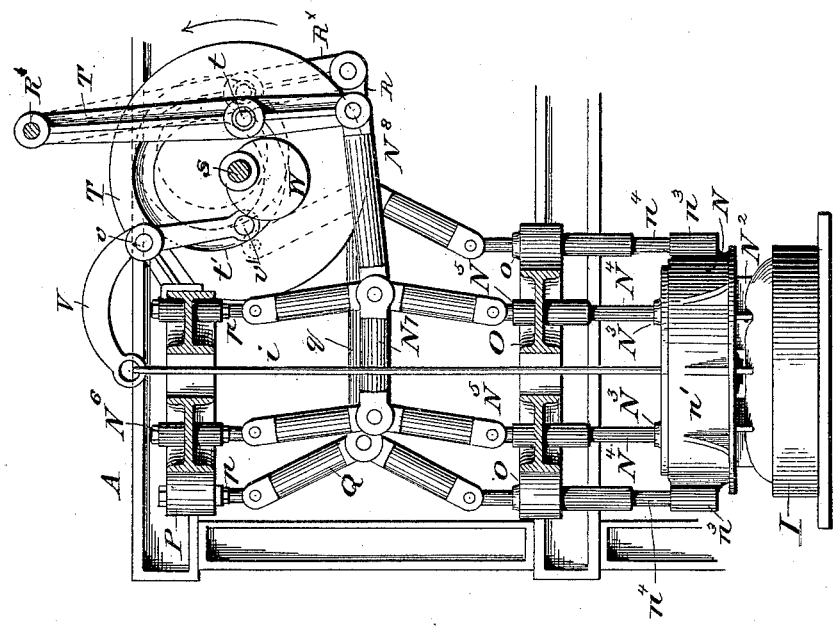
Figure 25:
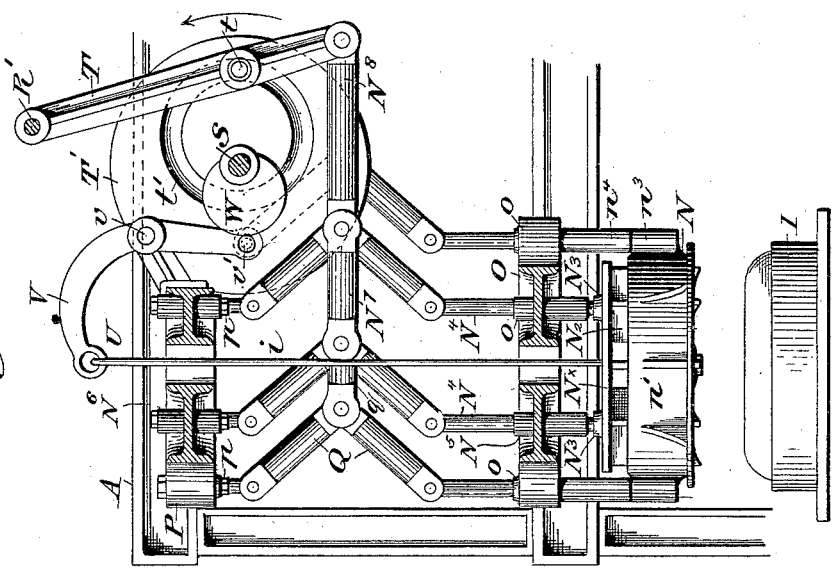
Figure 28:
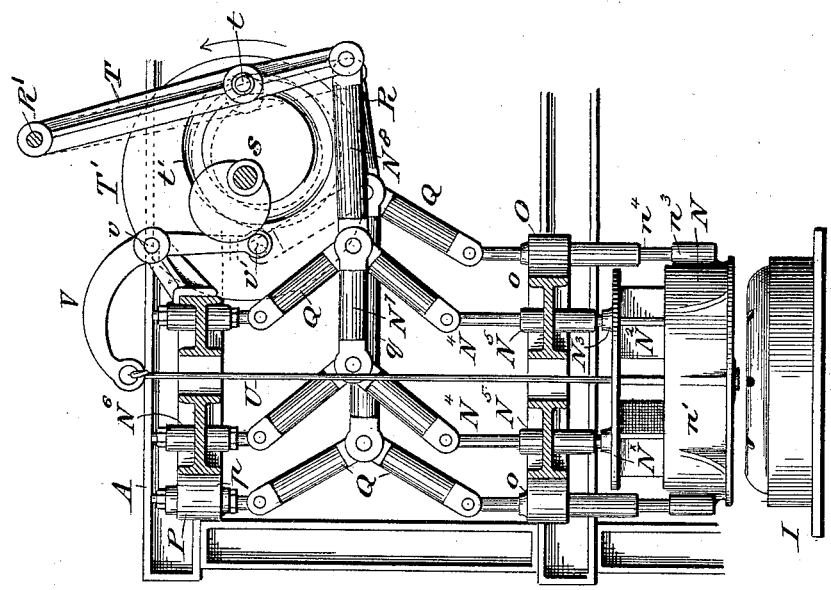
Figure 27:
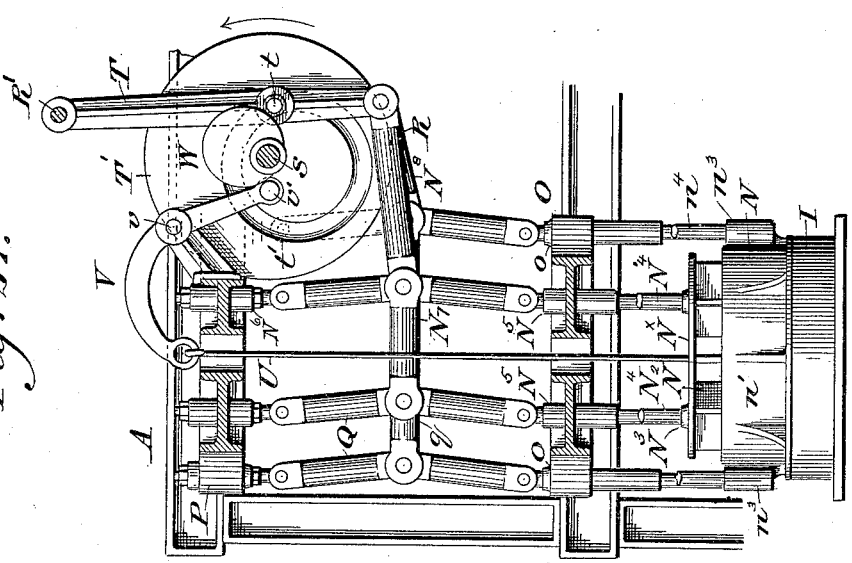
Figure 29:
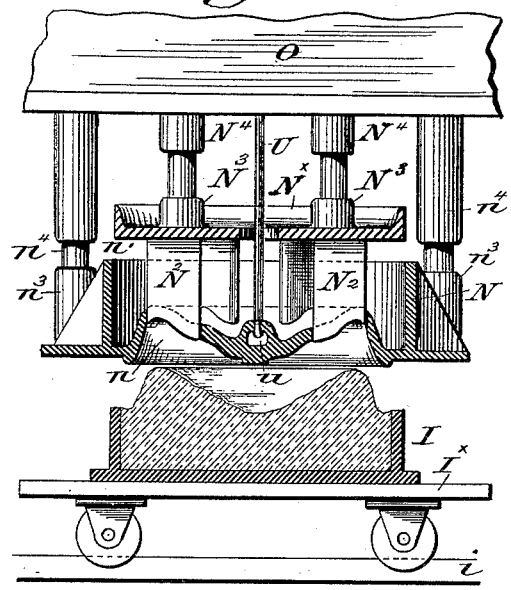
Figure 31:
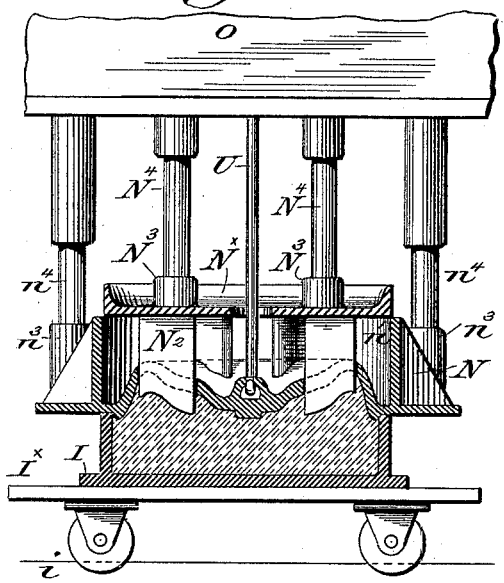
Figure 30:
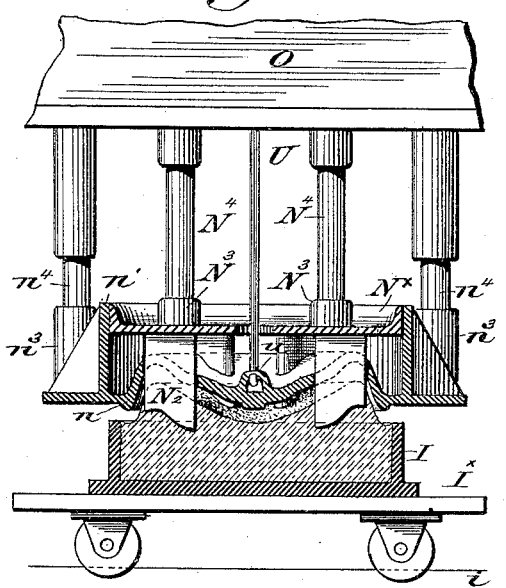
Figure 32:
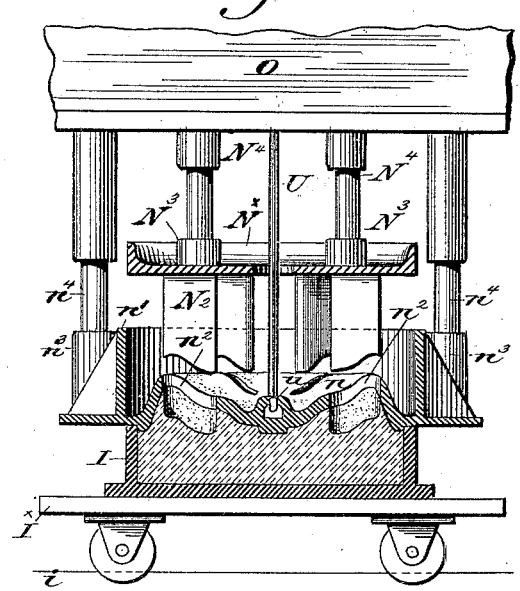

Fig. 24 is a detail view of the plunger-coupler, and the depending arm, illustrating the manner in which said coupler is held from operation. Figs. 25, 26, 27, and 28, are side elevational views of the supporting and operating devices, for the pattern which is made sectional, illustrating in Fig. 25 said devices at rest with the main and sectional patterns elevated; in Fig. 26 illustrating said main pattern elevated, the sectional pattern having descended; in Fig. 27 showing both main and sectional patterns depressed; and in Fig. 28 illustrating the relative positions occupied by the parts when the same are being elevated to their first position. Figs. 29, 30, 31, and 32, are side elevational views of the sectional pattern, and illustrating the successive positions occupied by the parts during the operation of compressing the sand mold,—in Fig. 29 illustrating all said parts at rest in an elevated position,—in Fig. 30 showing the main body of the pattern still elevated, and the sectional part thereof down,—in Fig. 31 showing all of said pattern down upon the sand,— and in Fig. 32 showing the main part of the pattern still down upon the sand, the sectional part thereof as having started upon its upward movement.

Similar letters of reference indicate corresponding parts.

It is to be understood that the machine described is duplex in its organization, being so constructed as to be capable of contemporaneously carrying on the formation of two independent and differently shaped molds within separate flasks.

In the drawings, A indicates the framework of the machine, being an iron skeleton framing, constructed, jointed and braced in any convenient manner.

Referring now more particularly to those parts of the drawings illustrating the mechanism, the especial province of which is to supply to and distribute the sand within the flasks, B is a sand pit or receptacle, of suitable arrangement and area, B' B' a pair of drums, one of which is located and suitably mounted for rotation within the sand pit, and the other mounted in the upper part of the framing near the sand-pit end thereof.

$B^\times$ is an endless chain provided with buckets $b$, and mounted upon said drums, the arrangement being such that on the rotation of the drums the buckets elevate the sand from the sand pit and discharge it into a three way chute C.

D, Fig. 3, is the shaft from which power is derived by the different elements of the machine, and which I term the main driving shaft, although the driving pulley $D^\times$ is not mounted upon it but upon a separate shaft $d^\times$, provided with a gear wheel $d^{\times\times}$, its power being communicated to the main driving shaft by the engagement of said wheel $d^{\times\times}$ with a gear wheel $d'$ on an idler shaft $d$, which has another gear wheel $d''$ in engagement with a gear wheel $D^{\times\times}$ on the main driving shaft.

$d^3$ is a bevel pinion mounted upon the shaft D, and $b^3$ is a bevel gear wheel in engagement with said bevel pinion, mounted upon a countershaft $b^4$ erected in suitable bearings and provided at its inner end with a driving pinion $b^5$ in engagement with a driven pinion $b^6$ on the end of the upper drum B', as shown in Figs. 2 and 3. Through the instrumentalities described the bucket chain is kept constantly traveling. The chute C into which the buckets empty is, as stated, a three way one, one branch leading to each side of the machine, and one leading back to the sand pit.

E E are what I term the receivers, being two in number, counterparts of each other, mounted and operated in exactly the same manner, and one of which is employed in connection with each of the two divisions of the machine. I therefore confine my description to a single receiver.

E' is a removable or false bottom to such a receiver as I employ conveniently conical in form, and of diameter preferably somewhat in excess of that of the receiver.

$E^2$ is a hanger rod, the lower end of which is secured to the bottom E', and which passes through the center of a spider casting $E^3$ bracing the upper end of the receiver, and which has its upper end attached to one end of a lever casting F fulcrumed upon a pivot shaft $f$, and which casting F is at its other end provided with a counterweight $F^\times$.

In the sides of the receiver are cast, or formed in any suitable manner, two or more vertical projecting ribs $e$, the upper ends of which are provided with studs $e^\times$. From adjacent portions of the framework spring arms $e'$ the outer ends of which are provided with slots into which the ribs $e$ fit and slide, which slots are narrow enough to prevent the passage through them of the studs $e^\times$.

The chute C has one way leading to each of the receivers.

$C^\times$ is a gate in width and height sufficient to close the chuteway in which it is located. A convenient mode of mounting and operating it is as follows:— A rotatable bar $c$ to which the gate is rigidly secured, extends across the floor of the chute. One end of the bar projects beyond the chute and is provided with an arm $c^\times$ extending in a direction right angular to the plane of the gate $C^\times$, so that the gate and arm together form what is in effect a bell-crank-lever.

To the side of the receiver is rigidly but adjustably attached an arm $c'$, the upper end of which is provided with an angle arm $c^2$ having an elongated slot in which plays a toe $c^3$ at the extremity of the angle arm $c^\times$.

Rigidly supported by attachment to neighboring parts of the framing, and inclosing the lower end of the receiver, is what I term a directing hood H, the same being preferably of the form of the frustum of an inverted cone.

Beneath the machine are two sets of rails $i$, upon each set of which is mounted a wheeled truck $I^x$, each carrying a portion I of a flask.

$J'$ is a shaft, mounted in suitable bearings, extending transversely through the machine, and passing beneath the two levers F at a point between their fulcrums and counterweights, said shaft being at such points provided with cams $J^x$ which bear against friction rollers $f^x$ mounted in the lower faces of said levers.

The end of the shaft $J'$ nearest the driving shaft is provided with one member J of a clutch device, and a clutch shaft $j$, mounted in suitable hangers $j^x$, provided as to its outer end with a driven bevel gear wheel $j'$ in engagement with a driving bevel pinion $j^{xx}$ on the main driving shaft,—is provided, as to its inner end, with the correlative member K of the clutch.

When the machine is in operation the clutch shaft $j$ is in constant rotation owing to its engagement with the driving shaft, but the shaft $J'$ is only in rotation at such times as the clutch members about to be described are locked in engagement with each other.

K is, as stated, the outer member of the clutch, and consists of a disk mounted and splined upon the clutch shaft $j$, having its inner face, or the face which bears against the other member of the clutch, flat, and being provided with a series of square sided peripheral slots or mortises $k$ cut through its substance.

J is a disk, preferably of the same diameter as the member K, and has its face which presents against the other member of the clutch flat,—and is mounted and splined upon the shaft $J'$. $j^2$ are two cheek pieces erected upon the back face of the member J, and extending in parallelism from the center to the circumference of the same. Between these cheek pieces a peripheral recess $j^3$, in width and depth preferably about correspondent to the slots $k$ in the other member of the clutch K, is cut through the substance of the member J.

$j^4$ is what I term the coupling plunger, it being any suitable device which, mounted upon or in connection with one member of the clutch, is capable at the same time of engaging with the other member and thus binding the two together. The inner end of the coupling plunger, which in my machine is mounted upon the member J, is prolonged, and at its extremity is secured by a pivot $j^5$ conveniently passing through the cheek pieces $j^2$, so that the said plunger is capable of a swinging or rocking movement. The body of the coupling plunger is of proper size and strength to extend, at the proper time, into, and preferably to completely fill, one of the slots $k$, and thus to bind the two members of the clutch together. Its outer end is provided with a heel $j^6$ which extends radially out beyond the periphery of the clutch and is suitably rounded off or beveled for a purpose hereinafter explained. The recess $j^3$ is preferably so formed as to limit, at a predetermined point, by the presence of a shoulder $j^7$, the throw of the coupling plunger. $j^8$ is a spring mounted in connection with the coupling plunger and which acts to press constantly the coupling plunger inward or in the direction of the clutch member K.

$k'$ is what I term the clutch pendant, it being the device which by permitting the coupling plunger to enter the slots $k$ or by acting to throw it out therefrom, controls the coupling or uncoupling of the clutch. The clutch pendant is a crescent shaped arm having its lower end of such curvature that its inner face is adapted to fit closely to the periphery of the clutch member J. It is mounted upon, and splined so as to turn with, what I term the pendant shaft $k^2$, which is in parallelism with the shaft $J'$. The lower end of the clutch pendant is, as to its side nearest the interior of the machine, tapered gradually, and the same side of the pendant is, midway of its length, provided with a detent $k^3$.

The operation of the clutch will be readily understood. The member K being supposed in rotation and the member J, in locked engagement therewith, as shown in Figs. 20 and 21, to uncouple the said parts, the clutch pendant is caused to swing inward and lie against the periphery of the member J, as shown in Fig. 22. In the continued rotation of the clutch, the heel $j^6$ of the coupling plunger will encounter the inclined plane on the side of the clutch pendant, and the travel of said heel up said incline will cause the withdrawal of the coupling plunger from the slot $k$ wherein it is engaged, and the heel $j^6$ will come into contact with the detent $k^3$, and the clutch member J be brought to a full stop, as is shown in Fig. 24, the pendant in such position lying in the path of and preventing the coupling plunger from re-entering any of the slots $k$, which in the further rotation of the clutch member K present before it. To throw the clutch again into bite the pendant shaft is slightly turned causing the pendant to swing away from the periphery of the clutch, whereupon the coupling plunger, under the stress of the spring, is immediately presented against the inner face of the revolving clutch member K, and so soon as a slot $k$ presents before it, the coupling plunger drops thereinto.

The pendant shaft $k^2$ may be conveniently provided with a spring arm $k^4$, see Fig. 9, provided with a spring $k^5$ attached to any adjacent part of the machine, the tendency of which is to maintain the clutch pendant normally in against the periphery of the clutch, so that the clutch is normally out of bite.

$k^6$ is a lever arm attached to the shaft $k^2$, and provided at its outer end with a depending reciprocating rod $k^7$ suitably mounted in the framework of the machine, and at its lower end provided with a projection or toe $k^8$ which presents beside one of the rails $i$ on which the truck $I^×$ runs. An arm $k^6$, depending rod $k^7$, and toe $k^8$, are provided in connection with each of the two sets of rails employed in the machine, and a similar set of clutch tripping devices is employed in connection with each clutch used in the machine.

$I'$ are rods extending through the base of the machine in parallelism with the rails, and one of which rods is employed in connection with each pair of rails, said rods being provided at such points as it is desired to bring the truck $I^×$ to a stop, and to hold it fixedly in position, with a recessed seat $I^2$ having sides which are inclined planes.

On the framework of the truck is a spring bolt $I^3$ mounted in suitable bearings therein, and impelled by a spring $I^4$ to present as far outward as possible, which movement is however limited by its head $I°$. Upon the truck arriving at a point nearly opposite to the recessed seat $I^2$ the inclined side of said seat encounters and retracts the bolt $I^3$, and upon said bolt reaching the recessed seat it is sprung thereinto. To release the bolt and allow the truck to resume its travel, the shaft $I'$ is by means of a lever $I^5$ at its extremity, tilted until the recessed seat clears the bolt, when a small counterweight $I^6$ rotates the rod back to its normal position.

The operation of so much of the device as I have now described is as follows:—When such sufficient quantity of sand as is required for the formation of a mold has been deposited within the receiver, it overcomes the weight of the counterweight $F^×$ and the receiver drops until the studs $e^×$ on the upper ends of its side ribs $e$ rest upon the arms $e^7$,—and this partial descent of the receiver, causes, through the arm $c'$, and angle arm $c^×$, the lifting into place of the gate $C^×$ in the chute, so that no more sand can enter the receiver, the sand subsequently deposited in the chute being diverted from its course and returned down the third branch of the chute to the sand pit. This partial descent of the receiver is a signal to the operator to push the flask laden truck, which had prior to this time, been placed in readiness out beyond the end of the machine, beneath the lower end of the hood H. As this is being done the spring bolt engages in the recessed seat $I^2$ and locks the truck firmly in position, and at the same time a cam $h$, Fig. 8, on the under side of the truck encounters the toe $k^8$, which by pulling upon the lever $k^6$ rotates the pendant shaft $k^2$ throwing the clutch pendant out from the periphery of the clutch member J, whereupon the constantly rotating member K becomes locked in engagement with the member J, causing the rotation of the shaft $J'$ and the cams $J^×$. The cams $J^×$ bear, as hereinbefore explained, against the under face of the levers F, and their rotation causes a further elevation of the outer, and consequent depression of the inner, ends of said levers. The receiver shell being held against further descent, the depression of the inner end of the lever allows its depending rod $E^2$ to descend and the false bottom $E'$ to sink below the base of the receiver shell, whereupon the sand contained in the receiver escapes at the annular opening thus formed between the receiver shell and the false bottom, discharges against the interior of the hood, and is directed into the flask, where it is deposited in an annular heap. The continued rotation of the cam $J^×$ brings its flattened portion to its top and thereupon the weight $F^×$ operates the lever to, through the rod $E^2$, bring the false bottom up against the receiver shell, and then to elevate the bottom and shell together to their first position, and in such elevation through the reversed operation of the gate controlling devices described, to open the chute gate $C^×$. The rod $I'$ is rotated by its lever, the truck pushed forward, and the toe $k^8$ and rod $k^7$, through the medium of a small spring placed under them, assisted by the operation of the spring $k^5$ hereinbefore described, rise to their first position, and in so doing rotate the pendant shaft $k^2$ and clutch pendant $k'$ to throw the clutch out of bite in a manner hereinbefore described.

Referring now to the devices which in my machine are employed to sweep or arrange the sand which has been fed to a flask by the contrivance already described, into a form which is substantially the same in configuration as the form into which subsequently applied pressure is to compact it,—L is a vertical reciprocatory rotary sweeper shaft, the lower extremity of which is equipped with a sweeper arm $l$ and a sweeper roller $l'$. The sweeper arm is made of metal or wood, rigidly attached in any desired manner, but preferably by a metal strap $l^2$, as shown, to the lower end of the sweeper shaft. The lower face of the arm is shaped to the configuration which it is desired that the sand should assume, and is provided with a downwardly and forwardly projecting metal flange $l^3$, conforming to said outline, and attached in any preferred manner to that side of the arm which in rotation is the advance side.

$l'$ is a roller, the axle $l^5$ of which has a bearing in the lower end of a depending arm $l^6$ the upper end of which is attached to a clamp $l^7$ secured to the shaft L. The shaft L passes through a vertical bearing $l^8$, and, above said bearing, is equipped with a bevel pinion $l^9$, which is splined upon said shaft so as to leave said shaft free for vertical movement through said pinion. The upper extremity of the shaft L passes through an elongated slot $L^×$ in the lower portion of a link $L'$, and is, above said slot, provided with a nut or similar detent $L^2$. The upper portion of said link is provided with a cam toe $L^3$, and the link, as a whole, is, at its end, provided with a steadying arm $L^4$, which at its outer end loosely surrounds the shaft $J'$, and serves to steady said link.

M is what I term the sweeper elevating wheel, the same being mounted upon a shaft $M^\times$, and being, as to one of its side faces, provided with a cam groove $m$, in which the cam toe $L^3$ is engaged.

M' is a bevel gear wheel, in mesh with and serving to rotate the bevel gear wheel $l^9$, said bevel gear wheel M' being mounted upon one end of a shaft journaled in suitable bearings $M^2$, the other end of which shaft is equipped with a gear wheel $M^3$.

The shaft $M^\times$ is provided with a gear wheel $M^4$ which engages with the wheel $M^3$, and drives it and also the bevel gear wheel M'.

The shaft $M^\times$ is, at its outer extremity, provided with a clutch member J and an opposing clutch member K mounted upon a separate shaft and in gear with the main driving shaft. This clutch is provided with a clutch pendant mounted on a clutch shaft and operated by the depression of a projecting toe situated near the truck rails, the construction of this mechanism and its operation being similar to that described with reference to the clutching and rotation of the shaft J'. The operation of the sweeper device will therefore be readily understood.

After the truck has been pushed or drawn by any convenient means from under the hood H, it, in its advance travel, next encounters another recessed seat $I^2$ in proximity to the sweeper mechanism and the truck and flask are locked in said position. At the same time the cam $h$ on the under side of the truck has encountered and depressed the toe $k^8$, and consequently the depending rod $k^7$, has by such depression brought into bite the clutch provided for the operation of the sweeper so that the shaft $M^\times$, thereupon begins its rotation. The rotation of said shaft $M^\times$ has two results, first, by the rotation of the wheel M to force the sweeper shaft L downward by reason of the engagement in the cam groove of said wheel of the cam toe of the link to which the upper end of said shaft L is attached, the path of the cam groove being so planned that the downward throw of the sweeper shaft brings the arm $l$ and the roller $l'$ upon the upper part of the sand contained in the flask. The second result of the rotation of the shaft $M^\times$ is to, by means of the wheels $M^4$ and $M^3$, impart rotation to the bevel gear wheel M', which latter being in mesh with, consequently causes the rotation of, the bevel wheel $l^9$.

The cam groove in the wheel M permits the sweeper devices to, as regards vertical movement, dwell at the lowest point of its depression for a sufficient length of time to permit the sweeper devices to effect the desired shaping of the sand. In the continued rotation of the said wheel, the said sweeper devices still rotating are, again elevated, which serves as a signal to the operatives to turn the recessed seat $I^2$ to release the truck, and as a signal to push the truck forward, which act releases the depressed projecting toe $k^8$, and causes the uncoupling of the clutch which is mounted on the shaft $M^\times$, and the temporary throwing out of operation of the sweeper devices.

The two sweepers employed in my machine are, as regards mounting and operation, exactly alike, and they differ only in the conformation of their lower faces, each being made of that configuration which is required by the mold to be made.

I now proceed to describe the devices which finally compress the sand in the flask into the form and to the compactness required.

The two half molds which the machine I am now describing is capable of contemporaneously forming, are designed, when completed, to be put together and form a complete car wheel mold.

Referring now to the figures of the drawings which illustrate the mechanism employed to compress the sand in the mold for the rib provided face of the wheel, and which mechanism is located in that side of the machine farthest from the main driving shaft; N is the main body of the pattern which is employed to compress or mold the sand into the form desired, and it consists essentially of the transverse web $n$, and the annular stiffening rib $n'$. $n^2$ are radial slots in the said web $n$.

$n^3$ are permanent sockets formed in the upper face of the pattern, and $n^4$ are upright rods, the lower ends of which are secured in place within said sockets.

O is what I term the guide plate, being a plate or web of metal supported in a horizontal position above the pattern N, by being attached in any preferred manner to adjacent parts of the framework of the apparatus.

$o$ are a series of guide bearings formed in the plate O.

In the drawings four of the uprights $n^4$ are shown as employed, they being so located that two of them are, in the direction of the length of the machine, in line with the other two.

P is what I term the holding plate, it being a metal plate of about the size of the plate O, and being located over said plate O in the upper part of the machine.

$p$ are a series of permanent holders, four of them being in position in the plate P correspondent to the position of the guide bearings $o$ in O. The holders are formed in my machine by passing bolts through vertical sleeves formed in the plate P and securing said bolts firmly therein by nuts.

Q are toggle or elbow joints or levers which consist of two members, the meeting ends of which are hingedly united by a joint, and the outer ends of which are respectively secured to the upper ends of the reciprocating upright $n^4$ and to the lower ends of the permanent holders. A link $q$ connects the elbow joints which are in the direction of the length of the machine in line with each other. To each of the two rear elbow joints is attached a separate reciprocating rod R.

In forming the mold under consideration it is desired to closely compact and sharply define the sand which is destined to mold the spokes on the wheel, and for this purpose the pattern employed is made sectional.

$N^\times$ is a transverse web of metal of size sufficiently small to enter the space bounded by the annular rib $n'$ of the pattern N. It is provided, on its under side, with a number of radial metal sections $N^2$, which are of such size as to enable them to pass through, but snugly fit, the radial slots $n^2$ in the web N. The upper side of the face of the pattern $N^\times$ is provided with permanent sockets $N^3$, conveniently four in number, in which are entered the lower extremities of four uprights $N^4$ which pass through guide bearings $N^5$ formed in the plate O.

$N^6$ are holders formed in the holding plate P and corresponding in number and distribution with the uprights $N^4$.

Between each of the uprights $N^4$ and its corresponding holder $N^6$, is arranged an elbow joint Q consisting of two members hingedly connected at the meeting ends, and which are located two behind the other two, each elbow joint being connected with the joint in front of it by a link $N^7$, and to the rear extremity of each link $N^7$ is attached a separate reciprocating rod $N^8$.

Each of the reciprocating rods R is, at its rear extremity, hingedly attached to a rock arm $R^\times$, the upper extremity of which has a bearing upon a shaft $R'$, extending transversely across the top of the machine. Intermediately of its length each rock arm is provided with a cam toe $r$.

S is a shaft extending transversely through the upper part of the machine in the vicinity of the shaft $R'$, and upon the shaft S are mounted wheels $S'$ each provided with a cam groove $s$, each wheel being located at the side of one of the rock arms $R^\times$ in such manner that the cam toe $r$ may take into its cam groove $s$.

Each of the reciprocating rods $N^8$ is, at its rear extremity, hingedly attached to a rock arm T, the upper extremity of which has a bearing upon the shaft $R'$, and said rock arm is, intermediately of its length, provided with a cam toe $t$. Upon the shaft S are mounted wheels $T'$, each provided with a cam groove $t'$, each wheel being located at the side of one of the rock arms T in such manner that the cam heel $t$ of said shaft may take into said cam groove $t'$.

The shaft S, at its extremity nearest the driving shaft, is provided with a clutch member, in connection with which is mounted the correlative member of the clutch on a clutch shaft in engagement by a bevel gear wheel with the main driving shaft. The clutch is controlled by a clutch pendant mounted on a pendant shaft which is in turn operated by a depending arm attached, at its upper end, and, at its lower end, provided with a projecting toe, by the depression of which the clutch is put in bite and the shaft S rotated.

The truck with the sand in place therein is pushed under the pattern, locked in place, the toe $k^8$ thereby depressed, and the clutch on the end of the shaft S, and consequently the shaft itself, thrown into operation.

The cam grooves in the wheels $S'$ and $T'$ are so formed and timed, that the rock arms T engaged in the latter begin their forward movement prior to the movement of the rock arms engaged in the groove of the wheels $S'$, and in the rotation of the wheel $T'$ the reciprocating rods $N^8$ are, through their engagement with the rock arms T, forced forward, with the result that each pair of elbow joints coupled by a coupling link and connected with a reciprocating rod $N^8$ is forced forward, and the two members of each joint straightened with respect to each other, whereby the sectional pattern $N^\times$ is depressed and the sand beneath it compressed. Shortly after the sectional pattern $N^\times$ thus begins its downward movement, the cam grooves in the wheels $S'$ begin to cause the rock arms $R^\times$ and attached reciprocating rod to move forward, with the result that each pair of elbow joints coupled by a coupling link, and connected with a reciprocating rod R is forced forward and the two members of each joint forced into a more or less straightened position with respect to each other whereby the main pattern is depressed and sinks into the sand.

As a result of the arrangement described the sectional member $N^\times$ of the pattern moves vertically independently of the main pattern.

U is a lifting rod, the lower end of which is caught in an eye $u$ in the main pattern, and which extends through central orifices in the plates O and P to a point above the machine, where its upper end is engaged with the outer end of a curved lever V suitably fulcrumed on a pivot $v$ secured in the framing and the inner end of which lever is provided with a friction-roller $v'$ which bears against and is controlled by a cam wheel W fixedly mounted on the shaft S. After the descent of the patterns, and when the time comes for their elevation, the retraction of the reciprocating rods $N^8$, under the influence of the cam actuated rock arms, causes the doubling of the connected elbow joints and the elevation of the sectional pattern. The rotation of the shaft causes the rotation of the cam wheel W, and the inner end of the lever V is depressed, and its outer end elevated, whereby, through the rod U, the main pattern is lifted.

In the division of the machine in which the mold for the unribbed face of the car wheel is formed, the arrangement is similar to the one described, save that the sectional web, and the uprights, elbow joints, links, pitman shafts, rock arms, and cam grooved wheels, for said sectional web, are not present. The pattern is mounted, depressed and elevated in identically the same manner as the main part of the sectional pattern described, and I therefore deem further specific description unnecessary.

Having thus described my invention, I claim:—

1. In a machine for making sand molds, in combination, a sand receiver and deliverer, a sweep mounted to be reciprocated and rotated, a pattern, a driving shaft, trains of mechanism leading from the driving shaft to said devices to operate them in due order, a flask, and means for conveying the flask through the machine, substantially as set forth.

2. In a machine for making sand molds, in combination, a sand receiver and deliverer, a sweep mounted to be reciprocated and rotated, a pattern, a driving shaft, a separate train of mechanism leading from the driving shaft to each of said devices, means for throwing each of said trains of gearing into and out of operation, a flask, and means for conveying the flask through the machine, substantially as set forth.

3. In a machine for making sand molds, in combination, a sand receiver and deliverer, a sweep mounted to be reciprocated and rotated, a pattern, a driving shaft, a separate train of mechanism leading from the driving shaft to each of said devices, a clutch mounted in each of said trains of mechanism, and means for automatically throwing said clutch into and out of bite, substantially as set forth.

4. In a machine for making sand molds, in combination, a sand receiver and deliverer, a sweep mounted to be reciprocated and rotated, a pattern, a driving shaft, a separate train of mechanism leading from the driving shaft to each of said devices, a truck for conveying the flask through the machine, a clutch forming part of each of said trains of mechanism, and clutch controlling mechanism constructed to be thrown into or out of action by the travel of said truck, substantially as set forth.

5. In a machine for making sand molds, in combination, a sand receiver and deliverer, a sweep mounted to be reciprocated and rotated, a pattern, a driving shaft, a separate train of mechanism leading from the driving shaft to each of said devices, a clutch mounted in each of said trains of mechanism, a truck for conveying the flask through the machine, a train of clutch operating devices mounted in connection with each of said clutches, and toes forming part of each of said train of clutch operating devices and which project into the path of, so as to be encountered by, the truck, substantially as set forth.

6. In a machine for making sand molds, in combination, a sand receiver and deliverer, a pattern, a driving shaft, a separate train of mechanism leading from the driving shaft to each of said devices, a clutch mounted in each of said trains of mechanism, a truck for conveying the flask through the machine, a train of clutch operating devices mounted in connection with each of said clutches, and toes forming part of each of said trains of clutch operating devices and which project into the path of, so as to be encountered by, the truck, substantially as set forth.

7. In a machine for making sand molds, in combination, a sweep mounted to be reciprocated and rotated, a pattern, a driving shaft, a separate train of mechanism leading from the driving shaft to each of said devices, a clutch mounted in each of said trains of mechanism, a truck for conveying the flask through the machine, a train of clutch operating devices mounted in connection with each of said clutches, and toes forming part of each of said trains of clutch operating devices and which project into the path of, so as to be encountered by, the truck, substantially as set forth.

8. In a machine for making sand molds, in combination, mechanisms constructed and arranged to form and compress sand contained in a flask mounted upon a truck which is propelled through the machine, separate trains of gearing communicating power from a suitable source to each of said mechanisms, a clutch mounted in each of said trains of gearing, each clutch consisting of two members, one of which members is provided with peripheral seats, a coupling plunger mounted upon the opposing member of the clutch and adapted to fit said seats, and means for controlling the movement of said coupling plunger, substantially as set forth.

9. In a machine for making sand molds, in combination, a truck to convey the flask through the machine, mechanisms which form and compress sand in a mold, trains of gearing which operate said mechanisms, a clutch mounted in each of said trains of gearing, a series of peripheral seats in one clutch member, a coupling plunger pivotally mounted upon the other clutch member, a clutch arm constructed when in the path of the coupling plunger to be encountered by and raise and hold the same from engagement with the peripheral seat provided clutch member, a shaft upon which said clutch arm is mounted, an arm projecting from said shaft, and a depending rod attached to said projecting arm and having its lower extremity equipped with a projection which extends into the path of the truck, substantially as set forth.

10. In a machine for making sand molds, in combination, a sand receiver provided with a removable bottom mounted independently of the receiver upon a depending rod, and a lever arm to which the upper end of said rod is secured, substantially as set forth.

11. In a machine for making sand molds, in combination, a sand receiver, provided with ribs on its side, arms into which the said ribs fit, a removable bottom, a depending rod, the lower end of which is secured to said bottom, a lever arm to which the upper end of said rod is secured, a counterweight attached to said lever arm, and a cam wheel bearing against said lever arm, substantially as set forth.

12. In a machine for making sand molds, in combination, a sand receiver provided with a removable bottom mounted independently of the receiver upon a depending rod, upon which bottom the receiver rests when being filled with sand, and means for at the proper time causing the rod to descend and lower the bottom and receiver until the receiver reaches the limit of its movement and the bottom descends below the receiver so as to permit the escape of the sand, substantially as set forth.

13. In a machine for making sand molds, in combination, a sand receiver, a removable bottom, a depending rod, the lower end of which is secured to said bottom, a lever arm to which the upper end of said rod is secured, a cam wheel bearing against said lever arm, a shaft upon which said cam wheel is mounted, a main driving shaft, gearing for connecting the main driving shaft with the cam shaft, and a clutch for throwing said gearing into and out of operation, substantially as set forth.

14. In a machine for making sand molds, in combination, an open topped receiver provided with a removable bottom supported by a depending rod extending up to a lever arm to which it is attached, and a spider casting clasping the upper end of the receiver and embodying a guide way for the depending rod, substantially as set forth.

15. In a machine for making sand molds, in combination, a flask, a receiver arranged to descend and provided with a removable bottom, means to cause said bottom to descend below the receiver, and a hood situated beneath the receiver adapted to direct the sand from the receiver into the flask, substantially as set forth.

16. In a machine for making sand molds, in combination, rails, a truck adapted to said rails, a spring bolt mounted upon said truck, a rotatable rod extending parallel to said rails, and bolt receivers mounted upon said rod, substantially as set forth.

17. In a machine for making sand molds, in combination, a sweep mounted upon a vertical shaft, gearing connected to said vertical shaft, the operation of which causes its descent, gearing connected to said vertical shaft, the operation of which causes its rotation, a power shaft mounted in connection with said gearing, a clutch mounted in connection with said gearing, clutch operating devices, a track supporting the flask, and a trip adapted to be encountered by the truck, substantially as set forth.

18. In a machine for making sand molds, in combination, a sweep mounted upon a vertical shaft, a link in which the end of said shaft is entered, a wheel provided with a cam way in which a projection on said link is entered, and a steadying arm attached to or forming part of said link and having its outer portion attached to a suitable point of support, substantially as set forth.

19. In a machine for making sand molds, in combination, a pattern, elbow joints secured to said pattern and to a supporting plate, links connecting adjacent elbow joints, reciprocating rods connected to the elbows, rock arms connected to the reciprocating rods, cam toes on said rock arms, cam grooved wheels in which said cam toes are engaged, a shaft on which said cam grooved wheels are mounted, and means for throwing said shaft into and out of operation, substantially as set forth.

20. In a machine for making sand molds, in combination, elbow joints secured to a pattern and to a supporting plate, reciprocating rods connected to the elbows, rock arms connected to the reciprocating rods, cam toes on said rock arms, cam grooved wheels in which said cam toes are engaged, a shaft on which said cam grooved wheel is mounted, means for throwing said shaft into and out of operation, a lifting rod attached to the pattern, a lever arm to which said lifting rod is attached, and means for operating said lever arm, substantially as set forth.

21. In a machine for making sand molds, in combination, elbow joints secured to a pattern and to a supporting plate, reciprocating rods connected to the elbows, rock arms connected to the reciprocating rods, cam toes on said rock arms, cam grooved wheels in which said cam toes are engaged, a shaft on which said cam grooved wheels are mounted, means for throwing said shaft into and out of operation, a lifting rod attached to the pattern, a lever arm to which said lifting rod is attached, and a cam wheel bearing against said lifting rod, substantially as set forth.

22. In a machine for making sand molds, in combination, a pattern consisting of two independently moving parts each of which presses upon a given part of the sand, elbow joints connected to said patterns and to the supporting plate, reciprocating rods connected to the elbow joints of the main pattern, separate reciprocating rods connected to the elbow joints of the sectional pattern, rock arms attached to the reciprocating rods of the main pattern, separate rock arms attached to the reciprocating rods of the sectional pattern, separate cam grooves in which the cam toes on said respective rock arms are engaged, a lifting rod, the lower end of which is attached to the main pattern, a lever arm to which the upper end of said lifting rod is secured, a pivot for said lever arm, and a cam mounted on the cam-grooved-wheel shaft by which said lever arm is tilted, substantially as set forth.

23. In a machine for making sand molds, in combination, a pattern, a supporting plate, elbow joints secured to said pattern and said supporting plate, a lifting rod attached to said pattern, and mechanism for causing the lift and drop of said lifting rod, substantially as set forth.

24. In a machine for making sand molds, in combination, a pattern, a supporting plate, elbow joints secured to said pattern and said supporting plate, a lifting rod attached to said pattern, a lever to which the upper end of said lifting rod is attached, and a cam which is adapted to operate said lever, substantially as set forth.

In testimony that I claim the foregoing as my invention I have hereunto signed my name this 17th day of July, A. D. 1888.

JOSEPH J. CARR.

In presence of:
J. BONSALL TAYLOR,
F. NORMAN DIXON.